United States Patent
Borghetti et al.

(10) Patent No.: US 7,516,186 B1
(45) Date of Patent: Apr. 7, 2009

(54) THREAD BASED VIEW AND ARCHIVE FOR SIMPLE MAIL TRANSFER PROTOCOL (SMTP) CLIENTS DEVICES AND METHODS

(75) Inventors: Stefano Borghetti, Viterbo (IT); Antonio Mario Sgro', Girifalco (IT); Gianluca Della Corte, Naples (IT); Leonida Gianfagna, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/060,269

(22) Filed: Apr. 1, 2008

(51) Int. Cl.
G06F 15/16 (2006.01)
G06F 15/00 (2006.01)
G06F 17/00 (2006.01)

(52) U.S. Cl. ............ 709/206; 709/204; 709/205; 709/207; 709/232; 715/503; 707/104.1

(58) Field of Classification Search ............ 709/204, 709/205, 206, 207, 232; 715/530; 707/104.1
See application file for complete search history.

(56) References Cited

U.S. PATENT DOCUMENTS

| | | | |
|---|---|---|---|
| 6,496,853 B1 * | 12/2002 | Klein | 709/206 |
| 6,775,689 B1 * | 8/2004 | Raghunandan | 709/206 |
| 2003/0110227 A1 | 6/2003 | O'Hagan | |
| 2006/0190493 A1 * | 8/2006 | Kawai et al. | 707/104.1 |
| 2007/0282956 A1 * | 12/2007 | Staats | 709/206 |
| 2007/0300153 A1 * | 12/2007 | Newman et al. | 715/530 |

\* cited by examiner

*Primary Examiner*—Philip C Lee
(74) *Attorney, Agent, or Firm*—Doster Greene, LLC

(57) ABSTRACT

A method for local archiving of e-mail messages in an e-mail client application according to various exemplary embodiments can include generating a mail thread including at least two e-mail messages transmitted and received between a message originator and at least one recipient; appending e-mail identification data into a header of the at least two e-mail messages when transmitted. The method may also include archiving related e-mail messages within the mail thread in an e-mail client application, comprising: searching for the related e-mail messages by identifying each e-mail message having a same message originator field; and merging non-redundant segments of each e-mail message into a single message document hierarchically by response level and timestamp. The method may further include displaying, on a display screen, the single message document according to a conversational view based upon a perspective of the response level of a user within the mail thread.

1 Claim, 7 Drawing Sheets

```
To: A
MIME-Version: 1.0
Subject: Example
From: B
Message-ID: <MSGID2>
Date: Wed, 5 Sep 2007 14:58:13 +0200
Message-Originator-ID: <MSGID0>
Thread-IDs: <MSGID0>,<MSGID1>,<MSGID2>
Thread-Timestamps : TIMESTAMP0, TIMESTAMP1, TIMESTAMP2
Thread-Levels : 0 , 1 , 2
Thread-Bodies: [133-240], [101, 131], [0, 99]

0 [BODY2 start]
99 [BODY2 end]
100 ----- Forwarded by ..... -----
101 [BODY1 start]
131 [BODY1 end]
132 ----- Replied to ..... -----
133 [BODY0 start]
240 [BODY0 end]
```

To: A
MIME-Version: 1.0
Subject: Example
From: B
Message-ID: <MSGID2>
Date: Wed, 5 Sep 2007 14:58:13 +0200
Message-Originator-ID: <MSGID0>
Thread-IDs: <MSGID0>,<MSGID1>,<MSGID2>
Thread-Timestamps : TIMESTAMP0, TIMESTAMP1, TIMESTAMP2
Thread-Levels : 0 , 1 , 2
Thread-Bodies: [133–240], [101, 131], [0, 99]

0 [BODY2 start]
99 [BODY2 end]
100 ------ Forwarded by ......------
101 [BODY1 start]
131 [BODY1 end]
132 ------ Replied to ......------
133 [BODY0 start]
240 [BODY0 end]

FIG. 1

THREAD BASED VIEW AND ARCHIVE FOR SIMPLE MAIL TRANSFER PROTOCOL (SMTP) CLIENTS DEVICES AND METHODS

FIELD

The present teachings relate to devices and methods for supporting a mail thread based view and archive for Simple Mail Transfer Protocol (SMTP) clients. Various embodiments relate to devices and method for organizing and summarizing messages in thread conversations in an electronic message system.

INTRODUCTION

In recent years, electronic-mail (also referred to as "e-mail" or "email") service is no longer used by companies only to exchange information. Now, it is also employed daily as discussion threads between colleagues working together, particularly, in a world wide scenario. Sometimes e-mails are also considered as official documents or records. For this reason, each employee must maintain a historical archive that the employee often searches to retrieve certain information relevant to a specific document or record.

Most conventional e-mail clients currently provide a mechanism to archive e-mails. However, in most cases, it is difficult for the user to search, find and retrieve the relevant content of an e-mail message, because the message may be embedded within a threaded discussion. A threaded discussion (also referred to as "a communication thread" or "a mail thread") may consist of a series of messages including forward and reply messages that may volley backward and forward between a number of senders and receivers. Therefore, the user is required to open each mail belonging to the thread to retrieve the specific document or record.

In some cases with conventional e-mail message systems, it is common for the user to reply or forward e-mails maintaining the received body, indicated as the reply or forward history. Such e-mail messages within the same mail thread typically contain redundant content. For example, if a user A sends a mail to user B and C and both user B and C reply, user A will receive two reply mails, but he has to archive both mail messages even if they contain, for instance, the same history portion or other redundant content.

SUMMARY OF THE INVENTION

The present invention may satisfy one or more of the above-mentioned desirable features. Other features and/or aspects may become apparent from the description which follows.

A method for local archiving of e-mail messages in an e-mail client application, according to various exemplary embodiments, can include generating a mail thread including at least two e-mail messages transmitted and received between a message originator and at least one recipient; appending e-mail identification data into a header of the at least two e-mail messages when transmitted, wherein the e-mail identification data includes at least: a message originator identification inserted into a message originator identification field; a message identification inserted into a thread identification field; a mail timestamp inserted a thread timestamp field; a thread level representing a response level of each e-mail message within the mail thread and inserted into a thread level field; and a thread body interval representing each segment of a mail body within the mail thread and inserted into a thread body field such that the thread body interval is re-calculated when each e-mail message is transmitted; archiving related e-mail messages within the mail thread in an e-mail client application, comprising: searching for the related e-mail messages by identifying each e-mail message having a same message originator field; dividing the mail thread into respective segments by analyzing the thread body field in each e-mail message; purging redundant segments from the mail thread by analyzing the thread identification field to identify the redundant segments; merging non-redundant segments of each e-mail message into a single message document by ordering the non-redundant segments hierarchically by the response level and the timestamp of each e-mail message; storing the single message document within the e-mail client application; and displaying, on a display screen, the single message document according to a conversational view based upon a perspective of the response level of a user within the mail thread.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

FIG. 1 is an example of an SMTP message formatted in accordance with the present teachings;

DESCRIPTION OF THE EMBODIMENTS

Figure 2:
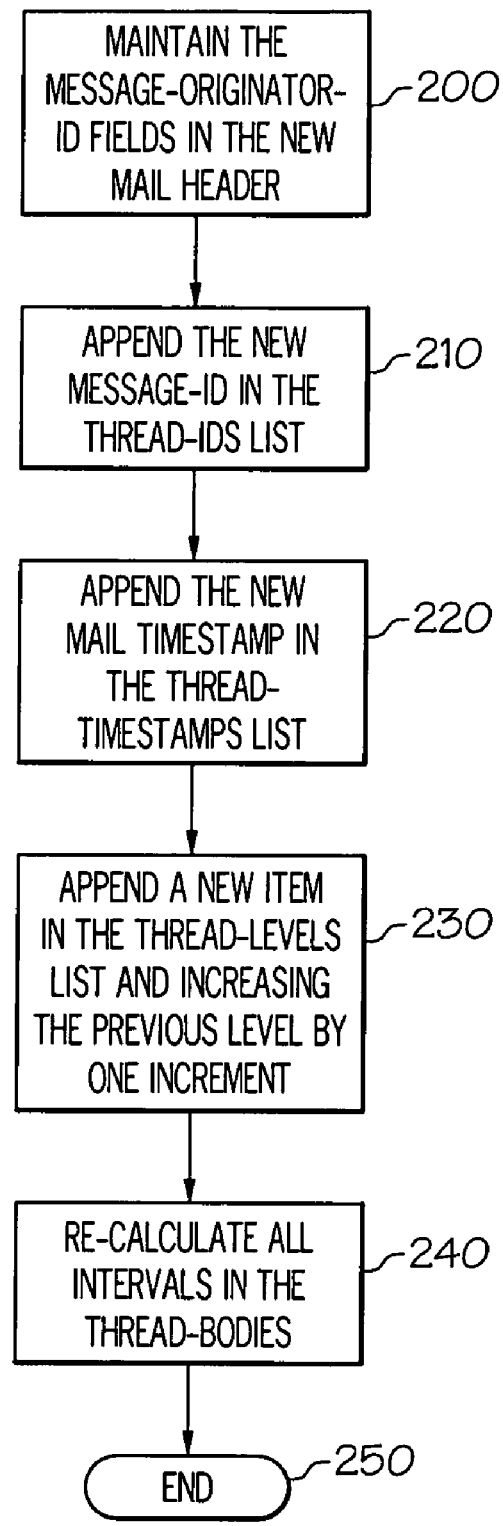
FIG. 2 is a flowchart of a process for building the SMTP shown in FIG. 1.

Reference will now be made to various embodiments, examples of which are illustrated in the accompanying drawings. However, these various exemplary embodiments are not intended to limit the disclosure. On the contrary, the disclosure is intended to cover alternatives, modifications, and equivalents.

Throughout the application, description of various embodiments may use "comprising" language, however, it will be understood by one of skill in the art, that in some specific instances, an embodiment can alternatively be described using the language "consisting essentially of" or "consisting of."

For purposes of better understanding the present teachings and in no way limiting the scope of the teachings, it will be clear to one of skill in the art that the use of the singular includes the plural unless specifically stated otherwise. Therefore, the terms "a," "an" and "at least one" are used interchangeably in this application.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

It is to be noted that the terms "thread", "mail thread", "threaded discussion", "discussion thread" and "communication thread" are used interchangeably in this application.

In various embodiments, a system and method may modify a standard "electronic message" Or e-mail message header and introduce new fields to be stored in association with the header. In various embodiments, the newly added header fields allow the system and method to provide an abstract of the mail structure in a cumulative manner. Moreover, the system and method may incorporate a user interface (UI) which allows the sender and receivers to manage the e-mail threads in archive on the client side of the application which will enable the user to merge or combine related e-mail threads into a single mail document. In various embodiments, the system and method may apply to the e-mail client without affecting the server or any component of the server side.

Furthermore, the process of analyzing the headers within the e-mail messages may identify related message threads in order to merge them into a single consolidated document and remove or eliminate redundant information from the consolidated e-mail messages in order to present an organized flowing conversation of the electronic messages without duplicate data. In various embodiments, the system and method may provide a hierarchical conversational view depending upon a specific user's perspective. In various embodiments, the system and method may purge the redundant segments of the mail thread and merge the remaining segments without analyzing or processing the content of the message because, in the present teachings, all the relevant information may be stored in the headers of the e-mail messages.

Figure 5:
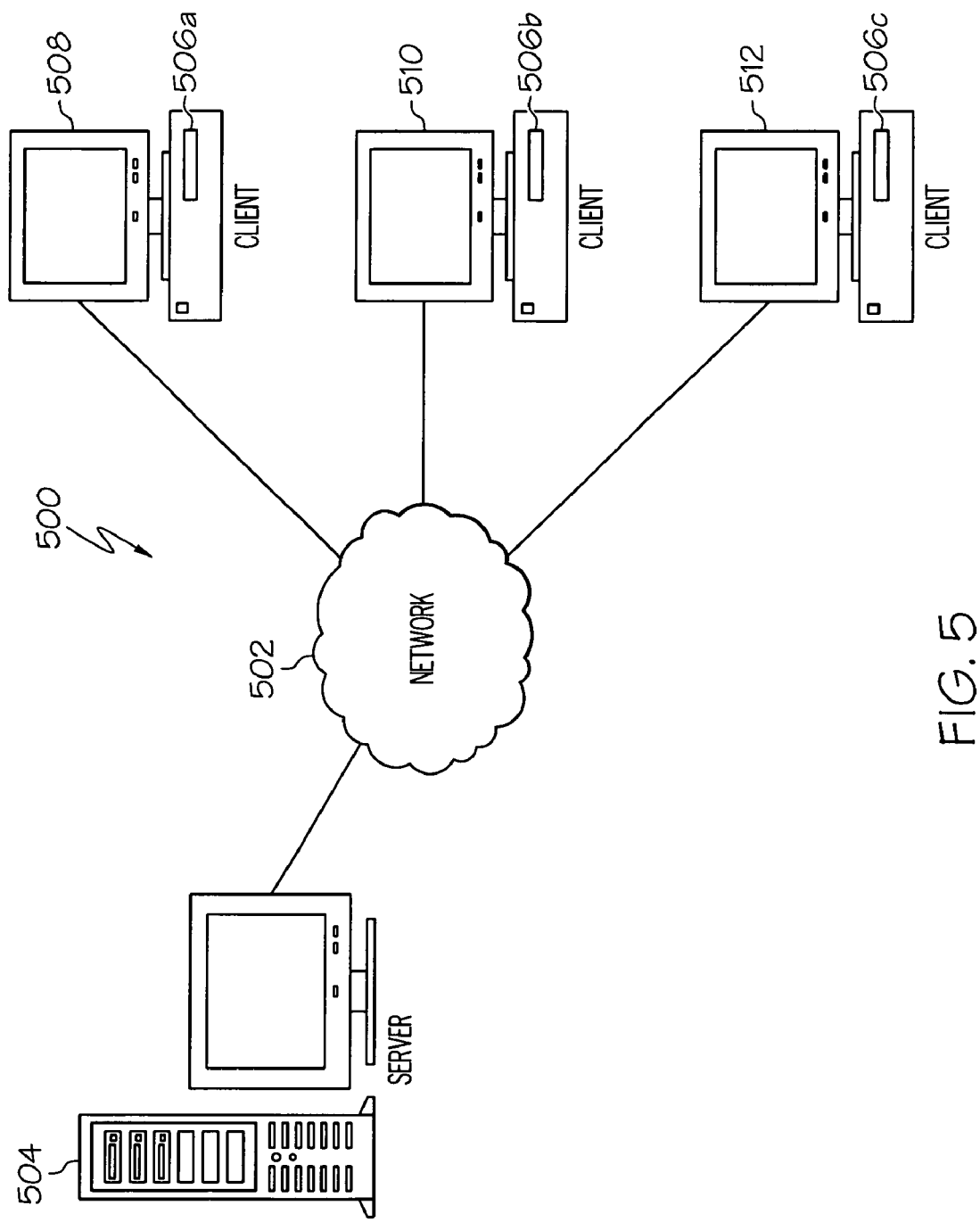
FIG. 5 depicts a representation of a network of data processing systems in which the system and device of the present teachings may be implemented.

With reference now to the figures, FIG. 5 depicts a pictorial representation of a network of data processing systems in which the system and the method of the present teachings may be implemented. Network data processing system 500 is a network of computers in which the device and method may be implemented. Network data processing system 500 may contain a network 502, which is the medium used to provide communications links between various devices and computers connected together within network data processing system 500. Network 502 may include connections, such as wire, wireless communication links, or fiber optic cables.

In the depicted example, server 504 is connected to network 502 along with clients 508, 510, and 512. In addition, storage unit 506a, 506b, and 506c may be embedded in clients 508, 510, and 512, respectively, for providing local archiving. These clients 508, 510, and 512 may be, for example, personal computers or network computers or personal digital assistants (PDAs). In the depicted example, server 504 may provide data, such as boot files, operating system images, and applications to clients 508-512. Clients 508, 510, and 512 are clients to server 504. Server 504 may act as an instant messaging server to facilitate the exchange of messages between users at clients, such as clients 508, 510, and 512. FIG. 5 is intended as an example, and not as an architectural limitation for the device and method of the present teachings.

According to the present teachings of the device and method, e-mails and e-mail messages may generally be understood as terms referring to a document or a collection of data transmitted between users of computers, typically by e-mail clients or e-mail programs. An e-mail client is a front-end computer program used to manage e-mail. E-mail is transmitted from an e-mail client to a mail server, usually using Simple Mail Transfer Protocol (SMTP), which has become the de facto standard for e-mail transmissions across the Internet. SMTP is a text-based protocol, in which one or more recipients of a message are specified along with the message text. The message is then transferred to a remote server using a procedure of queries and responses between the client and server.

The e-mail client responsibilities include properly formatting the message according to the Internet Message Format as defined in RFC 2822. As commonly known, an e-mail message consists of two major components: the header and the body. A standard message header may be structured into fields, usually including data that represents properties of at least the following:

Originator Field: The message's author
Destination Fields: To, Cc, and Bcc, which may represent the message's recipient(s)
Subject: A brief summary of the contents of the message
Date: The local time and date when the message was written.

The body is the unstructured text of the message.

Figure 4A:
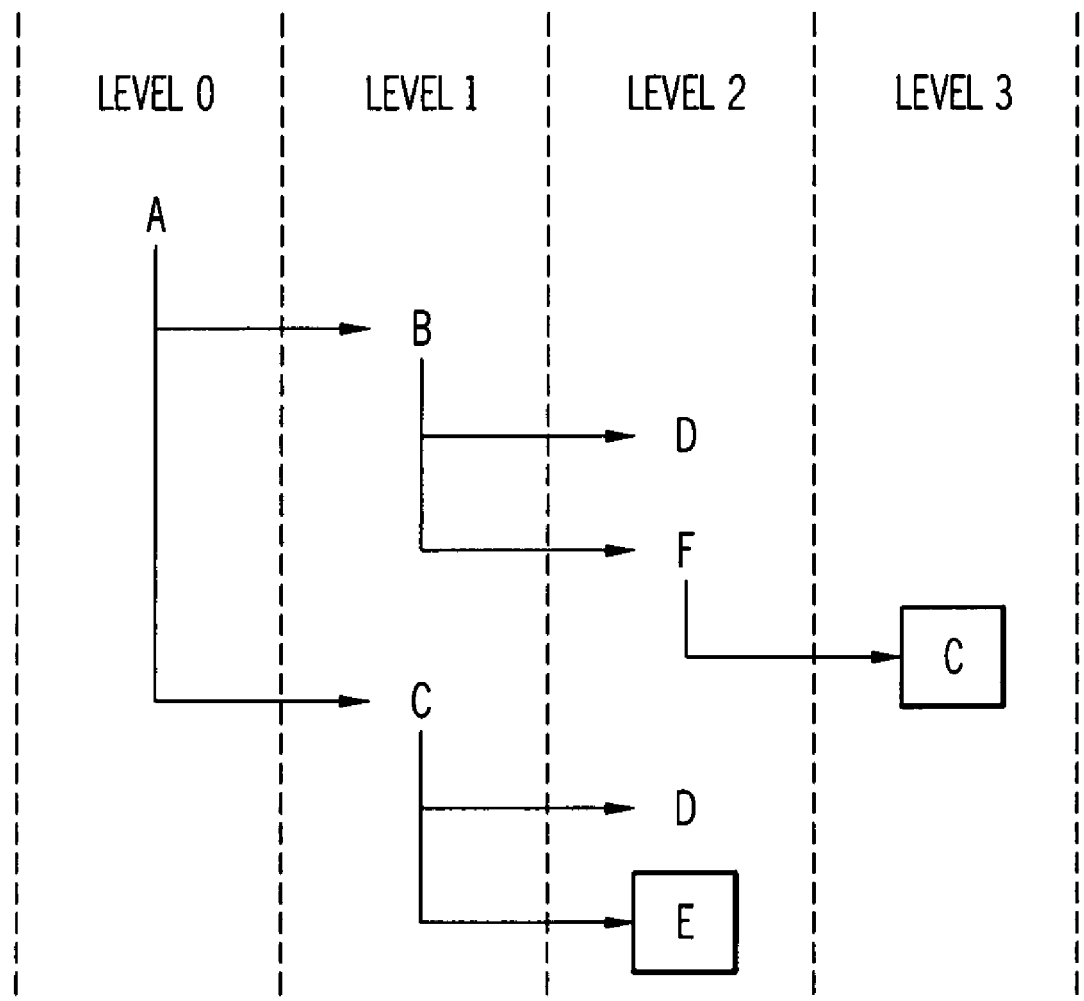
FIG. 4A illustrates a hierarchical graph of a mail thread.
Figure 4B:
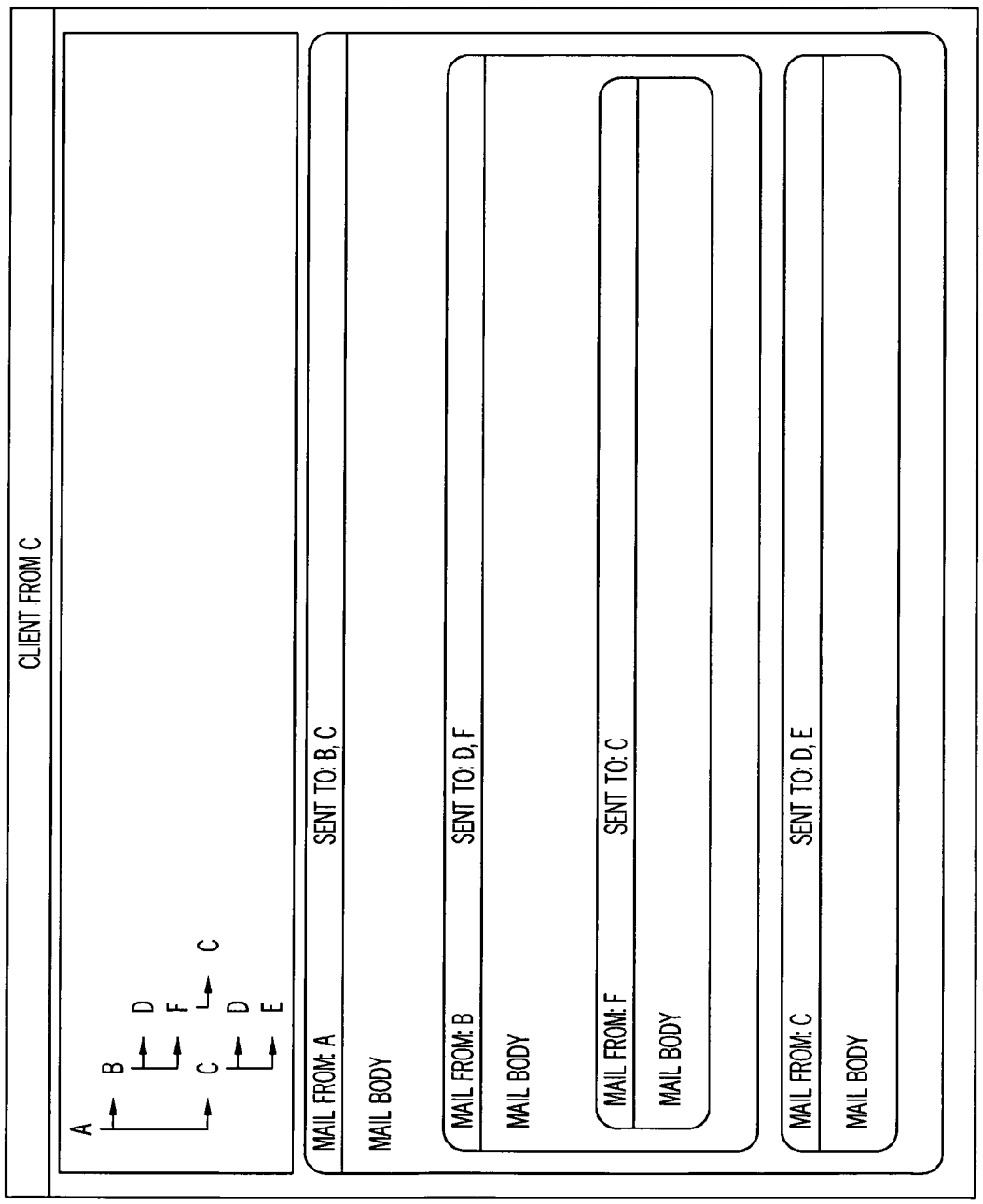
FIG. 4B illustrates a conversational view of the mail thread in FIG. 4A from Client C's perspective.
Figure 4C:
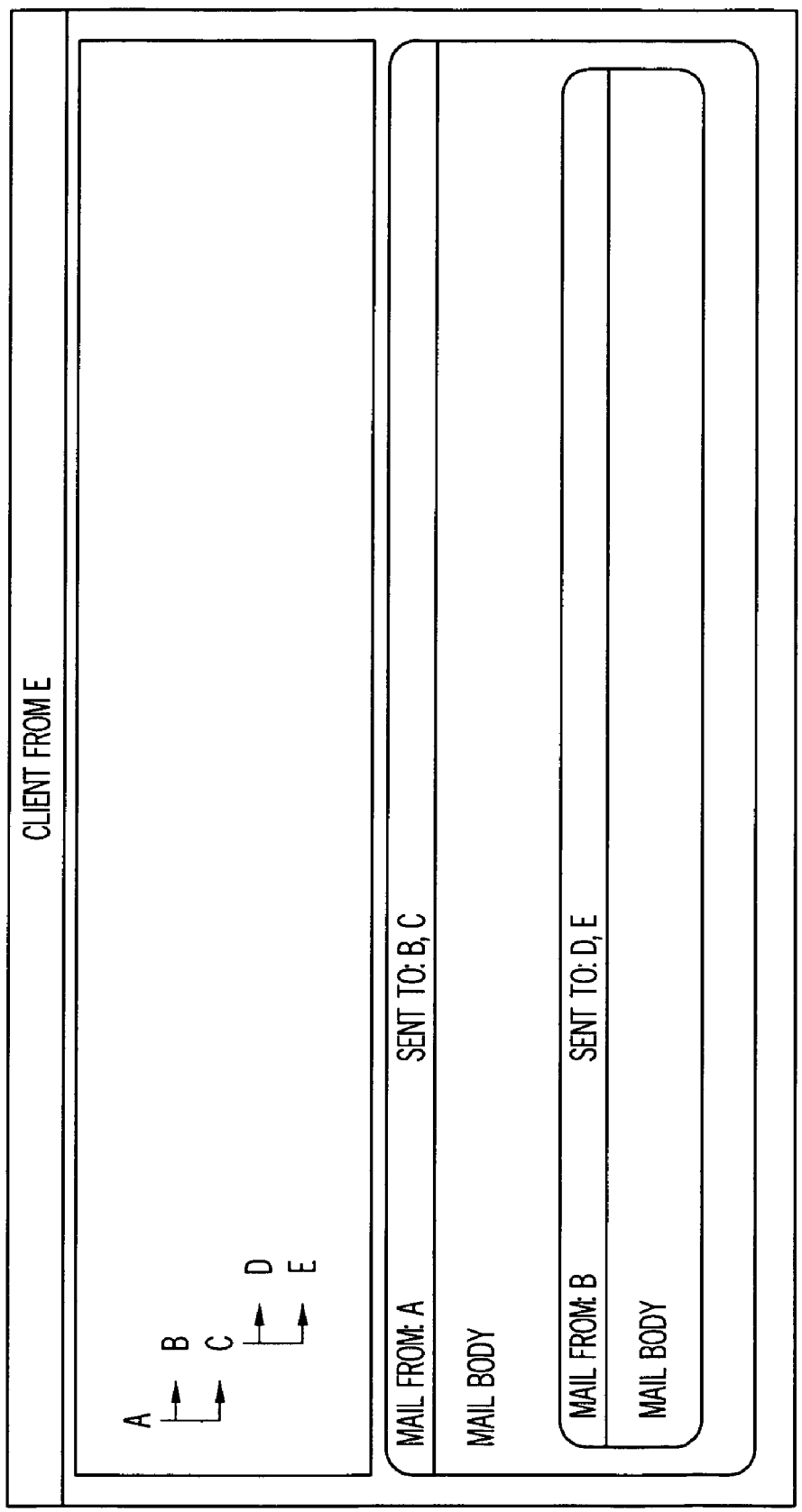
FIG. 4C illustrates a conversational view of the mail thread in FIG. 4A from Client E's perspective.

In various embodiments, in addition to the standard fields defined according to the RFC2822 protocol, the e-mail client may modify the header fields to accumulate information related to each part of the mail thread, including header and body information, and to insert the retrieved information as new fields within the header of the message. The newly accumulated information may be compiled and formatted into the header such that it provides an abstract description of the mail thread. For example, the system and method may modify a standard header to include the header information and at least one or more of the header fields as shown and described in FIG. 1 and the Table below:

| HEADER FIELDS | DESCRIPTION |
| --- | --- |
| Message-ID (Standard required field) | It contains a unique mail identifier and is already commonly used by SMTP clients. |
| Message-Originator-ID (Standard required field): | It contains the originator mail Message-ID. |
| Thread-IDs (Added field) | It contains a list of message IDs separated by commas. Each item refers to the Message-ID of each part in the mail thread. |
| Thread-timestamps (Added field): | It contains a list of epoch numbers separated by commas. Each item refers to the timestamp of each part in the mail thread. |
| Thread-levels (Added field) | It contains a list of numbers representing the response levels (as shown in FIGS. 4A, 4B and 4C). Each item refers to the response level of each part in the mail thread. |
| Thread-Bodies (Added field): | It contains a list of line intervals. Each item identify what is the range in the mail body that contains each part of the in the mail thread. |

FIG. 1 provides an example of a mail containing a discussion history such that, when B forwards the mail thread to A dated on Wednesday, Sep. 5, 2007 at 14:58:13, the e-mail client may build the SMTP as shown.

According to various embodiments, when a user replies to and/or forwards an e-mail message, the e-mail client may build the SMTP message to provide an abstract description of the mail structure in a cumulative manner by following the exemplary process described in FIG. 2. In step 200, the process may maintain the Message-Originator-ID field in the new mail header when B forwards the e-mail message to A. In the example of FIG. 1, the Message-Originator-ID field is shown as <MSGID0>.

In step 210, the process may append a new Message-ID in the Thread-IDs list. The process may append a new Message-ID for each message within the communication thread. In the example of FIG. 1, before B enters the discussion, the discussion history of the mail thread includes two previous messages represented by Message-IDs, for example, <MSGID0> and <MSGID1>. When B enters the discussion and forwards the mail thread to A, the process appends a new Message-ID for B, indicated as <MSGID2> in FIG. 1.

In step, 220, the process may append a new mail timestamp in the Thread-Timestamps list. In FIG. 1, for example, when B forwards the mail thread to A, the process may append TIMESTAMP2 to the already included timestamps TIMESTAMP0 and TIMESTAMP1. In step 230, the process may append a new item in the Thread-Levels lists by increasing the previous level by one increment. In the example of FIG. 1, the process modifies the Thread-Level field by adding Level 2 to the previous levels of Level 0 and Level 1, which correspond to Message IDs, <MSGID0> and <MSGID1>, respectively.

In step 240, the process may re-calculate all the intervals in the Thread-Bodies in order to maintain accurate reference to the correct parts or segments of the thread discussion. For example, the process may increase each thread-body interval with an offset that equals the length of the newly added text. In the example in FIG. 1, the process may re-calculate the interval such that at Thread Level 0, Mail Body 0 starts at line interval [133] and ends at line interval [240]; at Thread Level 1, Mail Body 1 starts at line interval [101] and ends at line interval [131]; and at Thread Level 2, Mail body 2 starts at line interval [0] and ends at line interval [99]. In step 250, the process may end.

In various embodiments, the system and method may rely exclusively on the newly added header fields within each message to recognize the parts or segments of the thread discussion to be merged into a single document. Various embodiments of the system and method may rely exclusively on the new fields within the header to identify the related e-mail messages within the mail thread. Thus, by introducing new fields in the e-mail which provides an abstract description of the mail structure, in various embodiments, the operation of the device and process may be relatively simple and robust, and may enable identification of related messages even in situations where the user decides to change the description of a "reply", "reply-all" or "forward" subject header field. Furthermore, this avoids the approach of some conventional devices and methods that rely upon the timestamp or time code fields. Such reliance upon the timestamp or time code may not be an effective or safe approach for e-mail management.

Figure 3:
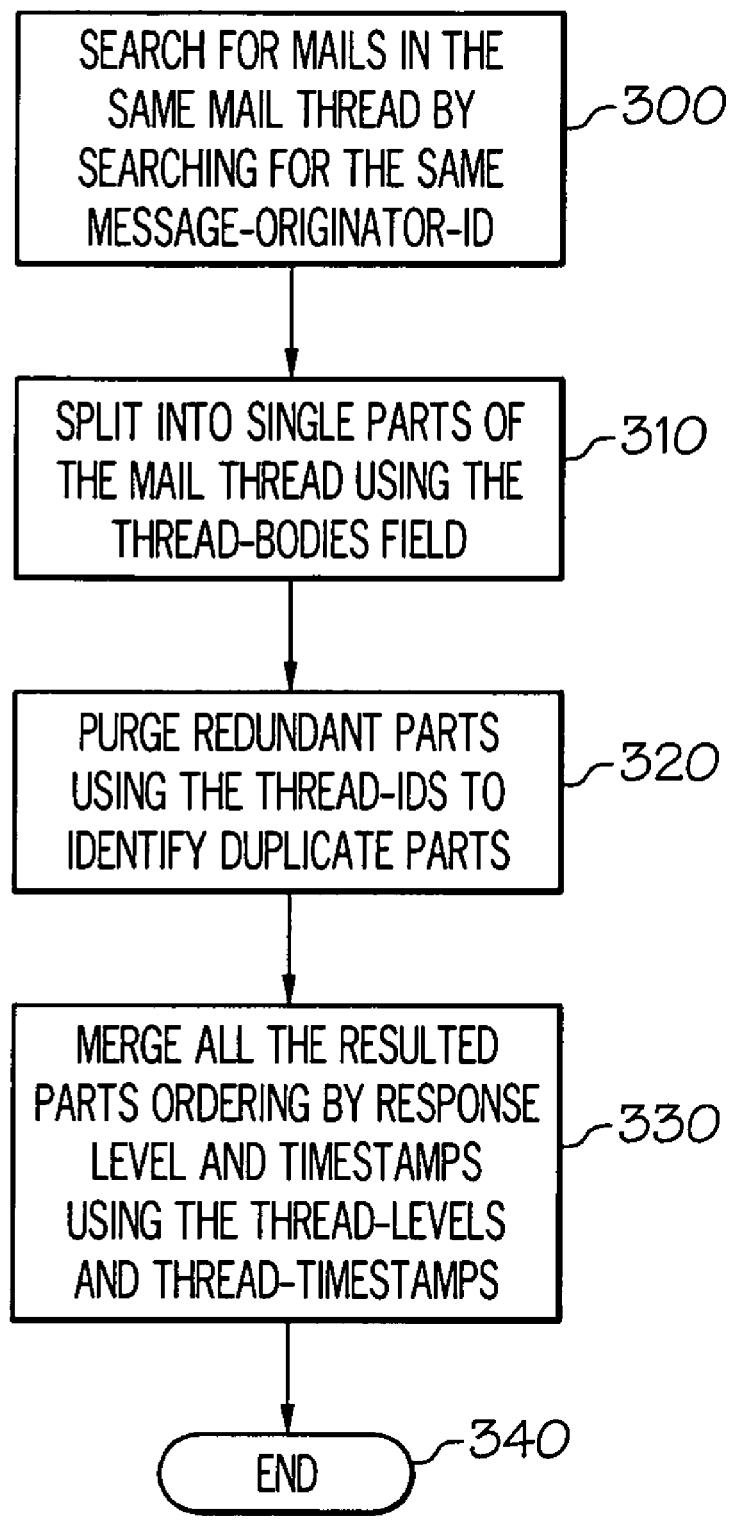
FIG. 3 is a flowchart of a process for identifying each segment of a mail thread, eliminating redundant content within the mail thread, and merging the related mail messages in accordance with the present teachings.

FIG. 3 illustrates an example embodiment for a given e-mail message as to how the system and method may propagate the data needed to identify each part or segment of the mail thread. FIG. 3 further describes the information needed to create a merged version of e-mails belonging to the same mail thread. Initially, the process in step 300 may search for mails in the same thread by, for example, searching for the same Message-Originator-ID. Although the use of the Message-Originator-ID approach is greatly more robust than other conventional approaches, in various embodiments of the present teachings, the process may employ other methods, for example, such as an address field search, a recipient field search, a sender search, a subject field search, a location search, an e-mail address search, a date search, a recency search or any configurations thereof to search for mails in the same thread.

In step 310, the process may use the Thread-Bodies field to divide the mail thread into individual parts or segments of the mail thread. As shown in FIG. 1, the process may divide the mail thread into respective mail bodies identified as Body 0, Body 1, and Body 2. As discussed above, in the example shown in FIG. 1, At Thread Level 0, Mail Body 0 starts at line interval [133] and ends at line interval [240]; at Thread Level 1, Mail Body 1 starts at line interval and ends at line interval [131] and at Thread Level 2, Mail body 2 starts at line interval [0] and ends at line interval [99].

In step 320, the process may use the Thread-IDs to identify duplicate content of the mail thread and purge the redundant parts or segments. In various embodiments, the cumulated header information may be used to recognize every single piece or segment of the mail thread. Therefore, the process may also need to maintain the cumulated header information in the merged document. Thus, the merged document may also use an e-mail format such that the cumulated mail thread information can be maintained in the header similar to the header formatting approach described above in reference to FIG. 1.

An example of a merging operation will now be described. In this example, it is assumed that the process has already built and stored in the user's local archive a merged document referring to the mail thread with Message-Originator-ID <MSGID0>. When the user decides to archive, for example, the mail in FIG. 1. Once the process splits the mail in Step 310, the result will be three individual mails: the first at Level 0, with Message-ID <MSGID0>, timestamp TIMESTAMP0 and a body contained in the range [133-240]; the second at Level 1, with Message-ID <MSGID1>, timestamp TIMESTAMP1 and a body contained in the range [101-131]; and the third at Level 2, with Message-ID <MSGID2>, timestamp TIMESTAMP2 and a body contained in the range [0-99].

As mentioned above, the merged document contains the merged bodies, but also maintains the mail thread additional information, in particular, the Message-ID of each single piece of mail. The Message-ID of each segment of the mail thread may be used as a unique identifier. At this point in this example, the process may merge each single mail from FIG. 1 if the merged document in the archive does not already include pieces of mail having the same Message-ID. If a document is examined and it contains a Message-ID already incorporated into the merged document, it is discarded. For example, when the process examines the header information of the e-mail message in FIG. 1, which was originally formatted to include Message-IDs, <MSGID0>, <MSGID1> and <MSGID2>, within the Thread-ID field, as described above, if the merged document already contains Message-IDs, <MSGID0> and <MSGID1>, the process will recognize that these segments in the e-mail message in FIG. 1 are redundant. The process will purge the redundant segments, <MSGID0> and <MSGID1>, and retain the non-redundant segment <MSGID2> to be incorporated into the merged document.

In step 330, the process may use information in the Thread-Level and Thread-Timestamps to merge all the remaining parts or segments ordering them by response level and timestamps. The process may end at step 340.

Various embodiments of the system and device can manage the e-mail threads in the archive on the client side of the application to merge or consolidate the related e-mail threads into a single mail document, as shown, for example, in FIGS. 4A, 4B and 4C. In many conventional e-mail services, various techniques have been employed for recognizing, grouping and reducing or eliminating redundancies within messages that belong to the same discussion. However, various embodiments of the present teachings accumulate information in the mail header to specifically identify and recognize each part or segment of a mail thread. This may permit the system and method to easily assemble the merged document using multiple mails each of them containing respective portions of the mail thread discussion.

Various embodiments of the system and device enable the user to compile and display a mail thread based view in the user's archive for the user to read in a conversational format similar to the approaches used by newsgroups and/or forums, as depicted in FIGS. 4B and 4C. Thus, in order to retrieve an archived message, the user will no longer need to open each individual message to read the content, instead the mail thread based view will display to the user a succession of e-mail messages involved in a mail thread ordered, for example, hierarchically by response level and timestamp, while hiding redundant content. The response level may represent the relationship of the messages within the flow of a conversation in a mail thread. The timestamp may represent, for example, the actual creation time, the time a message is received by an electronic message service for delivery, or any combination thereof.

FIG. 4A illustrates a hierarchical diagram for explaining an example of messages transmitted within a mail thread. The discussions within the mail thread may contain a series of message groups including forward and reply messages that may volley backward and forward between a number of senders and receivers.

In the example of FIG. 4A, at Level 0, Client A initiates the original message as the Message Originator and transmits the message to both Client B and Client C. At Level 1, Client B receives the message from Client A and transmits a message to Client D and Client F: while Client C receives the message from Client A and transmits a message to Client D and Client E. At Level 2, Client F receives the message from Client B and transmits a message to Client C.

According to various embodiments, the system and method may display the various levels of the mail thread based upon a specific-user's perspective, as shown, for example in FIGS. 4B and 4C. Rather than displaying the messages in chronological order, various embodiments of the system and method may organize and display the message thread in accordance with the flow of a conversation from each user's perspective. FIG. 4B depicts the mail thread in FIG. 4A from client C's perspective which includes the messages transmitted in Level 0, Level 1, Level 2, and Level 3. FIG. 4C provides a display of the same mail thread as shown in FIG. 4A, but from the view or perspective of client E. In comparison to FIG. 4B, FIG. 4C depicts the mail thread from client E's perspective which includes only the messages transmitted in Level 0, Level 1, and Level 2.

As shown in FIGS. 4B and 4C, various embodiments of the system and method provide the user with the ability to select, expand and collapse each mail body to display the non-redundant content of each message in a conversational format. This hierarchically threaded view allows the user to appreciate quickly the overall structure of a conversation, specifically regarding who is communicating with whom. For example, in FIG. 4B, if the user wishes to view the content of the message sent from Client F to Client C, the user may expand the mail body transmitted from Client F to Client C on Level 3. Expanding or collapsing the discussion threads may be performed, for example, by selecting a menu option or double-clicking on the threaded mail body.

The system and device may offer various features depending on when and how it is applied within the network. When applied to provide an archive view, in various embodiments, the process may enhance the system and method's usability by providing a relatively simple and robust system and method that may identify related messages even in situations where the user decides to change the description of a "reply", "reply-all" or "forward" subject header field.

In addition, the system and method may permit the merged mail to be directly stored in at least one local storage unit 506a, 506b, 506c. Therefore, the archive may be optimized in terms of conserving used space by suppressing the redundant portions before archiving the redundant mails attached in the mail.

While the preferred embodiment to the invention has been described, it will be understood that those skilled in the art, both now and in the future, may make various improvements and enhancements which fall within the scope of the claims and without departing from the scope and the teachings of the present disclosure. Thus, the claims should be construed to maintain the proper protection for the present disclosure.

What is claimed is:

1. A method for local archiving of e-mail messages in an e-mail client application, the method comprising:
    generating a mail thread including at least two e-mail messages transmitted and received between a message originator and at least one recipient;
    appending e-mail identification data into a header of the mail thread of the at least two e-mail messages when transmitted, wherein the e-mail identification data includes at least:
        a message originator identification inserted into a message originator identification field;
        a message identification inserted into a thread identification field;
        a mail timestamp inserted into a thread timestamp field;
        a thread level representing a response level of each of the at least two e-mail messages within the mail thread and inserted into a thread level field; and
        a thread body interval containing a start line interval and an end line interval representing length of a mail body of one of the at least two e-mail messages within the mail thread and inserted into a thread body field such that the thread body interval is re-calculated when each newly added e-mail message is transmitted;
    wherein the thread body field contains at least two thread body intervals;
    archiving related e-mail messages within the mail thread in an e-mail client application, comprising:
        searching for the related e-mail messages by identifying each of the related e-mail messages having a same message originator identification inserted in the message originator field;
        dividing the mail thread into respective segments by analyzing the at least two thread body intervals of the thread body field in the each of the related e-mail messages;
        purging redundant segments from the mail thread by analyzing the thread identification field to identify the redundant segments;
        merging non-redundant segments of the each of the related e-mail messages into a single message document by ordering the non-redundant segments hierarchically by the response level and the mail timestamp of the each of the related e-mail messages;
        storing the single message document within the e-mail client application; and
        displaying, on a display screen, the single message document according to a conversational view based upon a perspective of the response level of a user within the mail thread.

* * * * *